United States Patent [19]

Groezinger

[11] Patent Number: 4,926,353

[45] Date of Patent: May 15, 1990

[54] MEASURING APPARATUS FOR DETERMINING THE DEGREE OF UTILIZATION OF A MACHINE

[75] Inventor: Gerhard Groezinger, Spaichingen, Fed. Rep. of Germany

[73] Assignee: Sipra Patententwicklungs-und Beteiligungsgesellschaft GmbH, Albstadt, Fed. Rep. of Germany

[21] Appl. No.: 173,157

[22] Filed: Mar. 24, 1988

[30] Foreign Application Priority Data

Apr. 4, 1987 [DE] Fed. Rep. of Germany ....... 3711439

[51] Int. Cl.[5] .......................... G07C 3/08; G06F 15/36

[52] U.S. Cl. .......................... 364/551.02; 364/551.01; 364/554

[58] Field of Search .............. 364/550, 551.01, 551.02, 364/552, 554, 569; 377/16

[56] References Cited

U.S. PATENT DOCUMENTS 3,793,512 2/1974 Lorenzen .......................... 377/16 X
4,049,952 9/1977 Forsslund .............................. 377/16
4,089,056 5/1978 Barna et al. .................... 364/551.01
4,142,238 2/1979 Brandt et al. ....................... 364/552
4,179,611 12/1979 Mill et al. ............................ 364/550
4,471,348 9/1984 London et al. ................ 364/550 X

FOREIGN PATENT DOCUMENTS 2152907 4/1973 Fed. Rep. of Germany .
2206363 8/1973 Fed. Rep. of Germany .
217342 1/1985 Fed. Rep. of Germany ........ 377/16

*Primary Examiner*—Felix D. Gruber
*Attorney, Agent, or Firm*—Michael J. Striker

[57] ABSTRACT

A portable measuring apparatus for determining utilization factor of a machine includes a microphone for detecting operational noise of the machine and a computerized evaluation circuit driving a display device. From time intervals between the detected noise the evaluation circuit generates digital data indicative of work interruptions of the machine and divides total operational time of the measuring apparatus by the total non-operative time of the machine to determine and display the utilization factor of the machine.

7 Claims, 1 Drawing Sheet

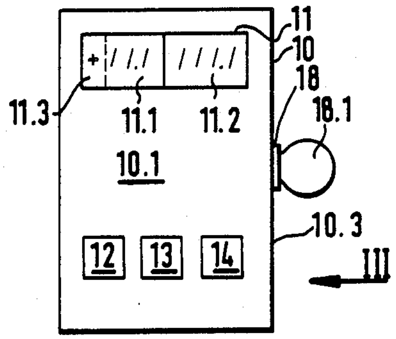
FIG. 1
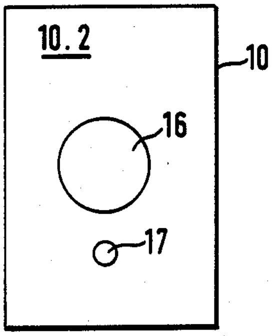
FIG. 2
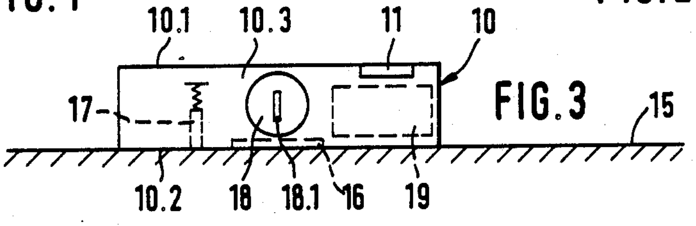
FIG. 3
FIG. 4
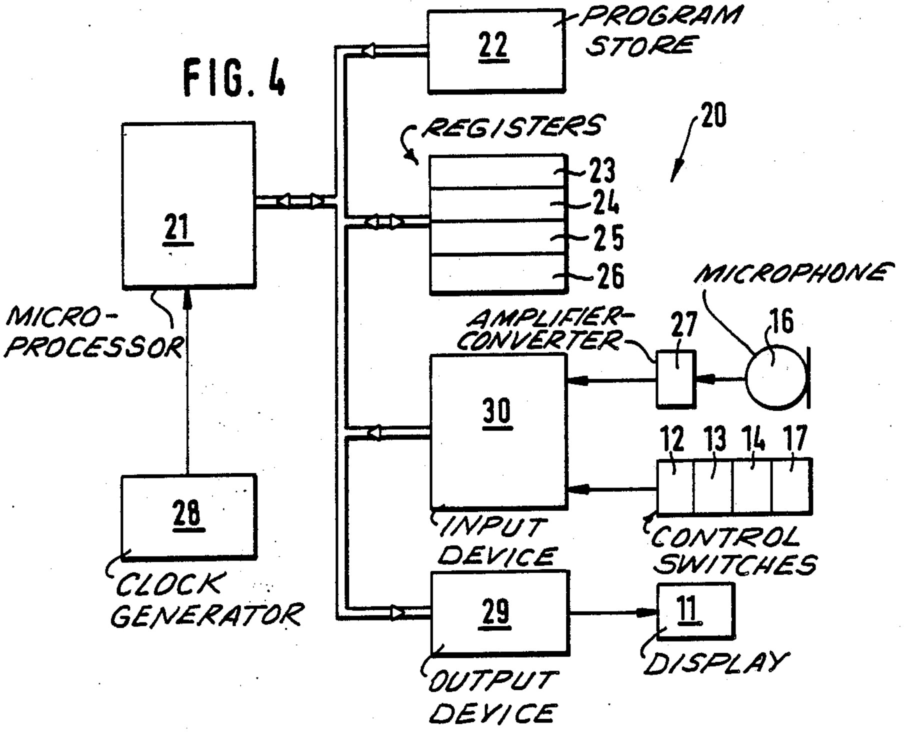

MEASURING APPARATUS FOR DETERMINING THE DEGREE OF UTILIZATION OF A MACHINE

BACKGROUND OF THE INVENTION

The present invention relates to a measuring apparatus for determining the utilization degree of a machine by means of a microphone which picks up working noise of the machine.

In monitoring devices of this kind described for example in the German publication DE-OS Nos. 22 06 363, and 32 52 907 it is known to pick up machine noise by means of a microphone and upon a change of the noise level to trigger a circuit.

SUMMARY OF THE INVENTION

An object of this invention is to provide a measuring apparatus of the aforedescribed kind which apart from measuring individual values of nominal operational time and work interruption time of a machine it determines also the degree of utilization of the monitored machine and displays the utilization degree value.

In keeping with this object and others which will become apparent hereafter, one feature of this invention resides in the provision of a computerized evaluation circuit for processing signals from the microphone according to a stored program, the evaluation circuit including a clock pulse generator, a microprocessor, input and output units and registers for storing data corresponding to nominal operational periods, non-use periods, to pausing periods and/or to the number of operational work interruptions and/or to the duration of the interruptions of the machine under test. The microprocessor by dividing the stored nominal operational period data with the disuse period data computes the momentary utilization degree value of the machine and continuously displays the same on at least one display device.

The measuring apparatus of this invention permits a manipulation proof determination of the degree of utilization of a machine. This feature is of importance particularly in industries operating with a large number of similar machines because it enables an objective comparison between the individual machines. The measuring apparatus can be either fixedly attached to a machine or preferably can be constructed as a separate unit which is placed on the machine whereby the supporting wall of the apparatus housing is provided with the microphone and the opposite housing wall which serves as a control panel is provided with at least one display device and with switchover keys. In the portable version of the apparatus, the housing contains, apart from the microphone and the evaluation circuit, also its own battery serving as a power source.

With advantage the display device is connected to switching means controlled by the switching key for selectively displaying the utilization degree value and/or the total operational time of the measuring apparatus (corresponding to the nominal operational time of the machine) or the number of machine interruptions and/or the duration of an interruption or the total time of the operational interruptions and/or the total pausing period of the machine.

In order to distinguish between normal pausing periods in the operation of the machine and operational interruptions caused by interferences or service work, the measuring apparatus is preferably provided on its control wall with a pause switch by means of which the apparatus in its switched on condition freezes the data in the storing register during the normal operational break. In this manner the non-desirable turning off of the apparatus for manipulation is eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a top view of the measuring apparatus of this invention;

FIG. 2 is a bottom view of the apparatus of FIG. 1;

FIG. 3 is a side view of the apparatus of FIG. 1 when viewed in the direction of arrow III; and FIG. 4 is a schematic block diagram of the computerized evaluation circuit in the measuring apparatus of the invention.

DESCRIPTION OF THE PREFERRED EMBODIMENT

Referring to FIGS. 1 through 3, the illustrated measuring apparatus has a housing 10 in the form of a rectangular prism. The top side 10.1 of the housing shown in FIG. 1 is provided with a display device 11 having two screen fields 11.1 and 11.2 and an additional screen field 11.3 for displaying the operational status of the apparatus. The function of three push buttons or press keys 12, 13 and 14 arranged on the top side below the display device will be described later.

The opposite bottom 10.2 of the housing is provided with a window for a microphone 16. As illustrated in FIG. 3, the bottom side in the working position of the apparatus rests on the upper surface 15 of a machine to be monitored so that the microphone picks up working noise of the machine. In addition, the bottom side can be provided with an opening for a spring-loaded feeler pin of a pause switch 17. The lateral wall 10.3 of the housing illustrated in FIG. 3 is provided with a key switch 18 operated by a key 18.1 (FIG. 1) to turn on and off the measuring apparatus. As illustrated by dashed lines in FIG. 3, the housing encloses its own power source or battery 19 which power supplies a computerized evaluation circuit 20 which is also installed within the housing. In FIG. 3 the spring-loaded actuation pin 17 of a non-illustrated switch is shown in its depressed condition.

A block circuit diagram of the computerized evaluation circuit 20 is illustrated in FIG. 4. The core of the evaluation circuit is a microprocessor 21 which by means of a bus is connected to a program storing means 22, a set of storing registers 23 through 26, an input processing unit 30 and an output processing unit 29. The microprocessor is time controlled by clock pulse generator 28 and its operation is controlled by a program retrieved from the storing means 22. Signals from the microphone 16 are amplified and converted into binary data in amplifying/converting stage 27. For example, as long as the microphone detects a noise, the stage 27 delivers logic "1", otherwise it delivers logic "0". As indicated by arrows, the binary data are supplied via the input processing unit 30 and a data bus into microprocessor 21 where the time intervals of respective occurrences of logic "1's" or "0's" are processed into digital data indicative of operation periods or work interruptions of the machine under test. The microprocessor also computes data corresponding to the total operational time of the measuring apparatus. The computed data are fed into respective storing registers 23 through 26. The input processing unit 30 is also connected to switching devices controlled by keys 18, 12, 13 and 14 which control the operation of the evaluation circuit 20 as it will be described later.

The display device 11 can simultaneously display on its screen fields 11.1 and 11.2 two data values. As soon as the microphone starts delivering signals, the evaluation circuit 20 displays on the screen field 11.3 a plus sign for example. If the voltage of the battery 19 falls below a preset level, the plus sign in the field 11.3 starts blinking. The storing register 23 stores data indicative of the total operational time of the measuring apparatus (indicative of the nominal operational time of the machine under test). The storing register 24 stores the total non-operative or disuse time period of the machine during its nominal operational time. The storing register 25 stores data indicative of the count of work interruptions resulting in the total non-operative or disuse time of the machine. Normal break times of the machine are stored in register 26 and corresponding data can be released by the control key 14. The key 14 is pressed for example when the operation of the machine is interrupted during a shift turn, lunch break and the like normal interruptions of the machine. During such normal non-operative time periods which are irrelevant for the computation of the utilization of the machine the data stored in individual registers 23 through 26 are simply held unchanged and are not affected by the microprocessor 21. The evaluation circuit 20 can include further non-illustrated registers, for example a register in which the longest work interruption of the machine is preserved.

The evaluation circuit of the measuring apparatus is programmed such that the display field 11.1 continues to display the computed momentary utilization values and the display field 11.2 keeps displaying the total operational time which has elapsed from the activation of the measuring apparatus, that means the total operational time plus the disuse time of the machine under test. By pressing the key 12 the display device 11 is switched over to show data of two storing registers. For instance, the display field 11.1 shows the count of work interruptions and the display field 11.2 shows the time period of a work interruption. By pressing the key 13, the display field 11.1 displays the total normal break time of the machine which has been summed up by pressing the key 14, and the display field 11.2 shows the total non-operative or disuse time (without normal break time), that means the data from the two storing registers 26 and 24.

The switch actuated by the spring-biased contact pin 17 is optional. It operates parallel to the key 14 for initiating pauses in the operation of the measuring apparatus. Accordingly, upon lifting the apparatus away from the upper surface 15 of a machine the apparatus is switched over for the normal break time.

When none of the two keys 12 and 13 is pressed, the microprocessor 21 continuously computes from the ratio of the total operational time of the measuring apparatus (without normal break times) and the total non-operative or disuse time of the machine, that means from the data stored in the registers 23 and 24, the degree of utilization of the machine and its momentary value is continuously displayed on the display device.

While the invention has been illustrated and described as embodied in a specific example of the machine efficiency measuring apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of the invention.

What is claimed as new and desired to be protected by Letters Patent is set forth in the appended claims:

1. A measuring apparatus for determining the degree of utilization of a machine, comprising a microphone for detecting operational noise of the machine; means for converting signals from the microphone into binary data indicative of the presence or absence of the noise; a computerized evaluation circuit including a microprocessor, a clock pulse generator for timing the microprocessor, means for storing a program for controlling the microprocessor; input means for receiving the binary data from said converting means and delivering the same into said microprocessor; said program controlling said microprocessor to generate first digital values indicative of the total operational time of the measuring apparatus and to process said binary data into second digital values indicative of the total non-operative time of the machine and of the count and length of individual work interruptions of the machine; a plurality of registers for storing said first and second digital values; said program further controlling said microprocessor to divide said first digital values by said second digital values to generate a third digital value indicative of the degree of utilization of the machine; and output means connected to a display device for continuously displaying said third digital value.

2. A measuring apparatus as defined in claim 1 further comprising switching means connected to said input means to control the evaluation circuit to selectively display a momentary operational utilization value of the machine and/or the total operational time of the apparatus or a count of the work breaks of the machine and/or the duration of a work break or the total time of operational interruptions and/or the total work break time.

3. A measuring apparatus as defined in claim 2 comprising a portable housing having a side carrying said microphone to engage said machine, and an opposite side provided with said display device and with control keys of said switching means, said housing enclosing said evaluation circuit and a power source for energizing said circuit.

4. A measuring apparatus as defined in claim 3 wherein a lateral side of said housing is provided with an on/off switch in the form of a key switch.

5. A measuring apparatus as defined in claim 4 wherein said side of the housing which carries said microphone is further provided with a spring-biased contact pin for controlling a switch in dependency on the engagement or disengagement of said housing with said machine.

6. A measuring apparatus as defined in claim 5 wherein one of the keys of said switching means on said opposite side of the housing controls a work break switch for holding constant values of the data stored in said registers during normal breaks of the machine.

7. A measuring apparatus as defined in claim 6 wherein said display device has a screen divided in separate display fields, one of said display fields indicating the working condition of the measuring apparatus.

* * * * *